Oct. 22, 1957   J. E. BRINZA ET AL   2,810,305
MULTI-SPEED POWER UNIT
Filed April 27, 1956   2 Sheets-Sheet 2

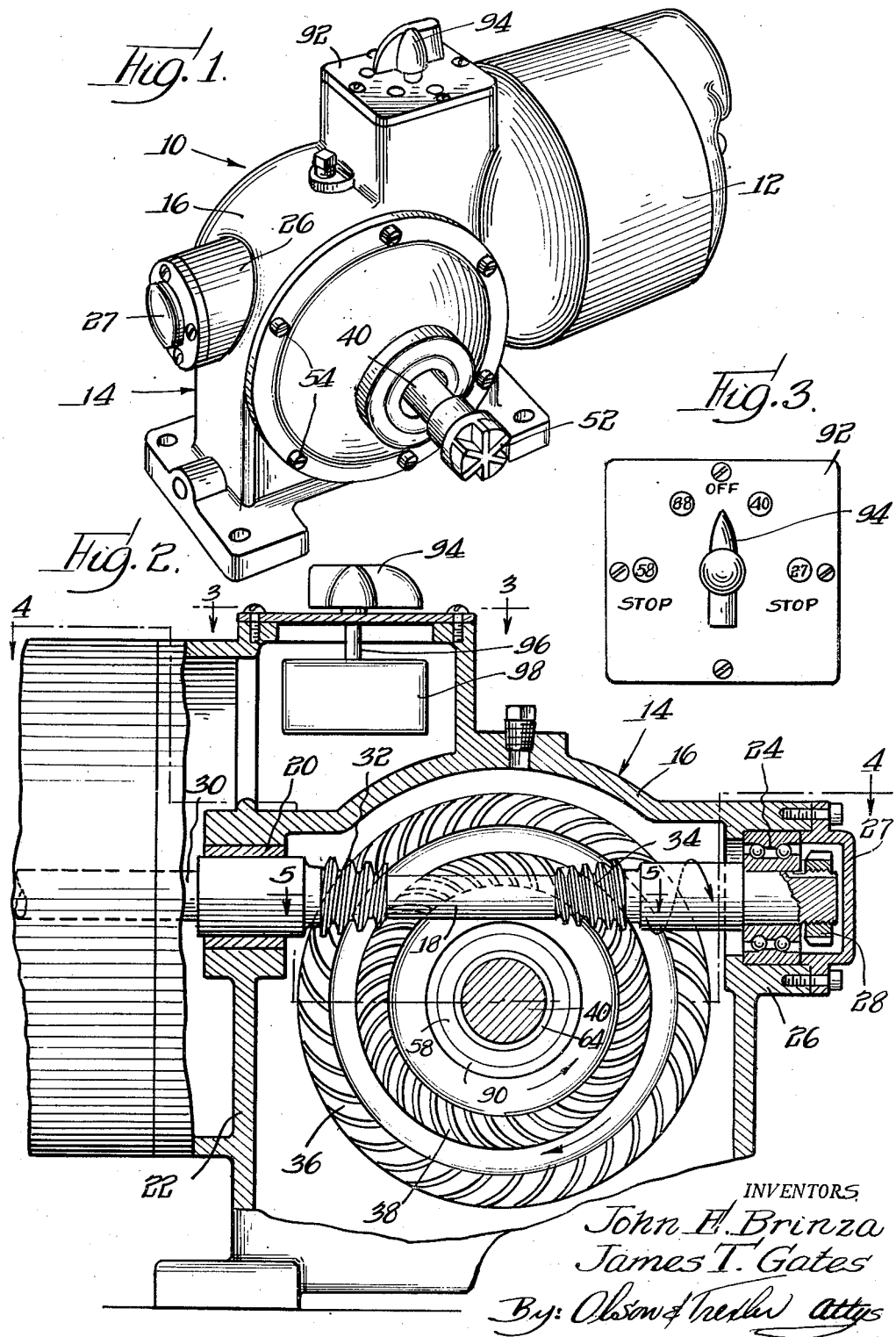

INVENTORS.
John E. Brinza
James T. Gates
By: Olson and Trexler Attys

United States Patent Office 2,810,305
Patented Oct. 22, 1957

2,810,305

MULTI-SPEED POWER UNIT

Joseph E. Brinza and James T. Gates, Cleveland, Ohio, assignors to Illinois Tool Works, Chicago, Ill., a corporation of Illinois Application April 27, 1956, Serial No. 581,159

10 Claims. (Cl. 74—812)

This invention is concerned generally with a power unit, more specifically a power unit comprising a motor and transmission producing a plurality of different output speeds.

Electric induction motors are widely used in industry and in household applications. As is well known, such motors are the most satisfactory known for a great many purposes, and have many virtues, including quiet and trouble-free operation, and long service life with little or no maintenance. However, such motors are inherently incapable of any substantial degree of speed control. Induction motors can be made to run forward or backwards, by such expedients as reversing the connections to the starting winding, and they can have the output speed changed in steps by suitably switching the main windings to vary the number of poles. However, there are generally only a few speeds available by this expedient, and these speeds necessarily are widely spaced apart.

Change-gear transmissions can be used to vary the speed at which a load is driven from a power source of essentially constant speed. However, change-gear transmissions are not fully satisfactory for many purposes, for a great many reasons including the fact that some sort of clutch must be provided, or else considerable shock is imposed on the system when gears are changed.

Accordingly, it is an object of this invention to provide a power unit including an induction motor and a transmission producing a plurality of output speeds without the changing of any gears.

It is another object of this invention to provide a power unit comprising an induction motor having two forward speeds, and having two reverse speeds of equal magnitude to the forward speeds, and a transmission for producing a plurality of different output speeds all in the same direction.

Yet a further object of this invention is to provide a novel power unit comprising an induction motor and a constantly meshing transmission.

Other and further objects and advantages of the present invention will be apparent from the following description when taken in connection with the accompanying drawings, wherein—

Fig. 1 is a perpsective view of a power unit constructed in accordance with the principles of the invention;

Fig. 2 is a view partially in longitudinal section and partially in front elevation;

Fig. 3 is a detail view of the speed control dial as taken along the line 3—3 in Fig. 2;

Figure 4:
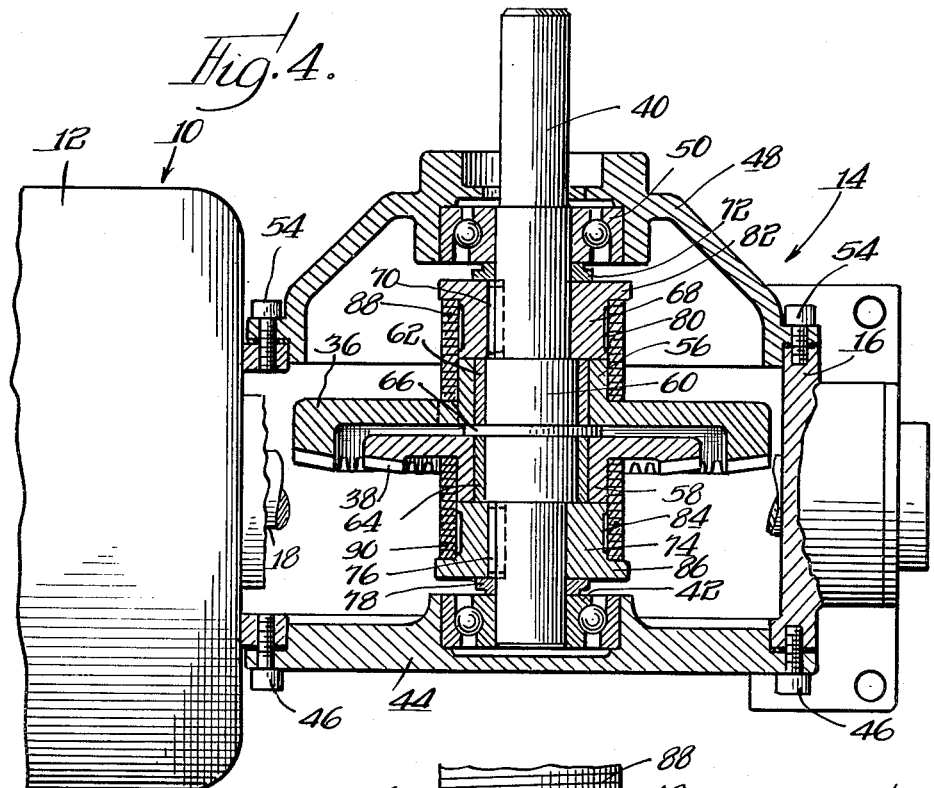
Fig. 4 is a view forming mostly a horizontal section as taken substantially along the line 4—4 in Fig. 2.
Figure 5:
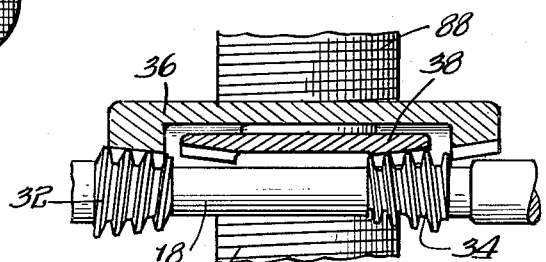
Fig. 5 is a sectional view in the transmission as taken along the line 5—5 in Fig. 2.

Referring now in greater particularity to the drawings, there will be seen a power unit 10 including an electric induction motor 12 of the type having two forward speeds and two reverse speeds. The forward and reverse speeds are of equal magnitude but opposite direction, and each speed (forward or reverse) bears a direct relation to the other, being produced by varying the number of poles. The power unit 10 also includes a transmission indicated generally by the numeral 14, and having a housing 16.

A pinion shaft 18 extends through the transmission housing and is supported by a bearing 20 positioned in a spider or wall 22 of the housing, and by a bearing 24 mounted in a boss 26 extending from one side of the housing 16. An end cap 27 is detachably mounted on the boss, and a nut member 28 is threaded on the end of the pinion shaft to hold the parts in properly assembled relation. The pinion shaft 18 preferably is formed integral with, but may be joined to, the motor shaft 30, as will be understood.

Tapered worms 32 and 34 of relatively opposite pitch are fixed on the pinion shaft 18 in spaced relation to one another, and relatively toward the opposite ends of the pinion shaft.

The tapered worms or pinion gears 32 and 34 respectively mesh with worm or face gears 36 and 38 mounted for rotation on a common shaft 40. The gear 38 is smaller than the gear 36, and is mounted within the gear 36 so that the teeth of the two gears are substantially coplanar.

One end of the shaft 40 is journalled in a bearing 42 in an end plate 44 detachably secured on the transmission housing by means such as screws or bolts 46. The opposite end of the shaft 40 projects from the transmission housing through a more or less bell shaped end cover 48 having a suitable bearing 50 therein journalling the shaft. The shaft may be provided on the extending end with a clutch or coupling member 52 as is shown in Fig. 1. The end cover 48 is detachably secured on the transmission housing by means such as screws or bolts 54.

The gear 36 is provided with a rearwardly extending cylindrical flange 56, and the gear 38 is provided with a forwardly extending cylindrical flange 58. The gears are mounted for rotation on an enlarged portion 60 of the shaft 40 by means of suitable sleeve bearings 62 and 64, respectively. A radially extending circumferential flange 66 formed on the shaft 40 is interposed between the gears, and also between the bearings for positioning the gears and bearings.

A clutch member 68 is keyed to the shaft 40 at 70 abutting the cylindrical flange 56 and the bearing 62, and this clutch member is backed up by a spacer 72 engaging bearing 50. The gear 36 and bearing 62, the clutch member 68, and the spacer 72 therefore all are positioned by the flange 66 and the bearing 50. Similarly, a clutch member 74 abuts the cylindrical flange 58 on the gear 38, and it is keyed to the shaft 40 at 76. A spacer 78 is interposed between the bearing 42 and the clutch member 74. Accordingly, the gear 38, the bearing 64, the clutch member 74, and the spacer 78 are positioned precisely on the shaft 40 by the circumferential flange 66 and by the bearing 42.

The clutch member 68 is provided with a generally cylindrical body portion 80, and with a circumferential flange 82 at the end opposite to the gear 36. Similarly, the clutch member 74 includes a generally cylindrical body portion 84, and a radially extending circumferential flange 86 at the end opposite to the gear 38. A helical spring clutch member 88 encircles the cylindrical flange 56 and the generally cylindrical body portion 80 of the clutch member 68, the spring being backed up at its opposite ends by the body of the gear 36 and by the flange 82 on the clutch member 68. A similar helical spring member 90 is mounted on the flange 58 and body portion 84 of the clutch member 74, being positioned between the body of the gear 38 and the flange 86. The gears 36 and 38 are rotated relatively oppositely for any given direction of rotation of the pinion shaft 18, and the spring clutch members 88 and 90 are designed to be alternatively effective. Thus, for one direction of rotation of the gear 36 the spring 88 will wind up and tighten about the flange 56 and the body portion 80, and the gear 36 thus will rotate the shaft 40 in a given direction. At the same time, the gear 38 is rotating in the opposite direction, and the spring 90 unwinds a slight bit, and lets the gear 38 slip relative to the clutch member 74. Upon reversing the directions of rotation of the gears, the spring member 90 locks the gear 38 to the clutch member 74, and the shaft 40 is driven in the same given direction of rotation. In this instance, the spring member 88 loosens up and the gear 36 turns freely relative to the clutch member 68.

In the preferred form of this invention, the worms 32 and 34 and the accompanying gears 36 and 38 are of the type disclosed and claimed in Saari U. S. Patent No. 2,696,125, dated December 7, 1954. In accordance with that patent, the worm threads have a constant axial lead and are of uniform cross sectional shape throughout their lengths and are formed to meet with gear teeth having a substantially ideal cross sectional shape throughout their lengths, in other words, having no appreciable inoperative fillets or undercuts. Such worms and gears permit high reduction ratios, and it will be appreciated that high reduction ratios are needed in conjunction with an induction motor having speeds approaching 1200 or 1800 R. P. M., while the output speeds of the shaft 40 in this specific form of the invention are respectively 27, 40, 58 and 88 R. P. M. In such worms and gears, several teeth are in simultaneous contact at all times. Accordingly, large amounts of power can be transmitted. Gears of this type can be economically manufactured, and have extremely long service life, besides permitting some adjustment in installation. Each worm has a plurality of complete thread convolutions, and the worms may be provided with single or multiple start threads. As is taught in the aforesaid Saari patent, the worms are frustums of cones having only a moderate taper. Each worm is positioned relative to the apex or point of a projected cone coincident with the roots of the threads of that worm so that the worm and the aforesaid point lie on opposite sides of the line which is mutually perpendicular to the worm shaft and the gear shaft, it being understood that the worms and gears are skew axis gearing. The common perpendicular between the worm and gear axes in each case is less than the radius of that gear. Generally speaking, the reduction ratios are greater than 9:1.

In accordance with one specific embodiment of this invention, the motor 12 has an output speed of either 1140 R. P. M. or 1725 R. P. M. Accordingly, in order to obtain the output speeds of 27, 40, 58, and 88 as inscribed on the speed selector plate 92 of Fig. 3, the worm 34 and gear 38 provide a reduction ratio of 20 to 1, while the worm 32 and gear 36 provide a reduction ratio of about 43 to 1.

Selective speed control is effected by means of a control knob 94 fixed on a shaft 96 of a switch mechanism 98. The switch mechanism is of a type known in the art, and the knob 94 has a pointed end cooperating with various speed indicia on the plate 92. The switch is shown as mounted on the unit, but it could be located at some remote position for remote control of the unit. Remote control also could be effected by means of a servo device for operating the switch.

Figure 6:
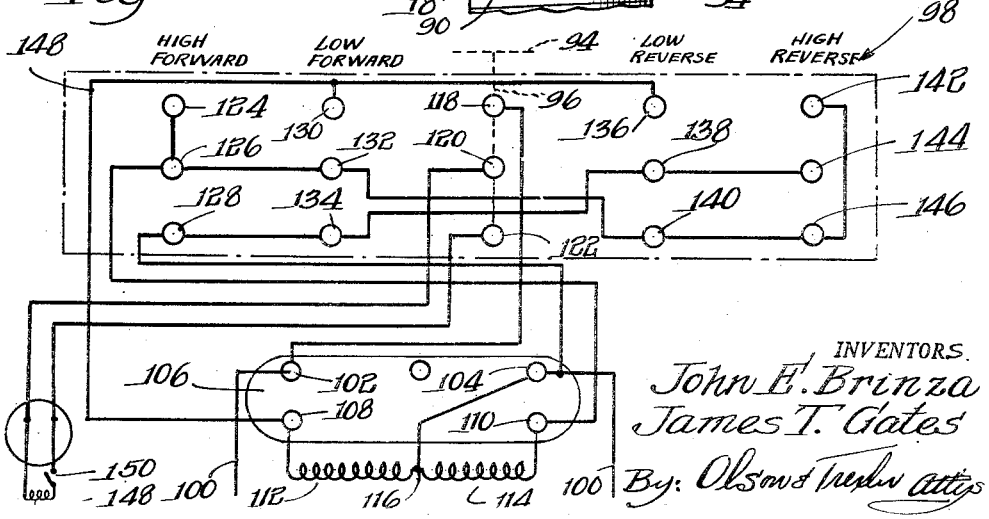
Fig. 6 is a wiring diagram of the motor control.

More specifically, and with reference to the wiring diagram of Fig. 6, the line wires are identified by the numeral 100. These wires are supplied with the usual 110 volt, 60-cycle, single phase power, and are connected to a pair of terminals 102 and 104 on a terminal board mounted on the motor 12. The terminal board, hereinafter identified by the numeral 106, is provided with terminals 108 and 110 connected to the main motor windings comprising a low speed coil 112, wound for three poles, and a high speed coil 114, wound for two poles. The junction 116 of these two coils is connected to the terminal 104 previously mentioned.

The switch mechanism 98 comprises three movable contacts 118, 120 and 122 mounted on the shaft 96 for rotation thereby. The movable switches are engageable with any of four sets of fixed switch contacts. The first set of switch contacts is identified by the numerals 124, 126 and 128. The second set is numbered 130, 132, and 134, while the third set is numbered 136, 138, and 140, and the fourth set is numbered 142, 144, and 146. Although the shaft 96 and switch contacts 118, 120, and 122 carried thereby are rotary, they may be considered as laterally shiftable for purposes of the layout wiring diagram of Fig. 6. The fixed switch contacts 130 and 136 will be seen to be connected to a common wire 148 leading to the terminal 108 of the terminal board 106. The contacts 126, 132, 140, 146, and 142 are connected in common to the terminal 110, while the contacts 128, 134, 138, and 144 are connected in common to the terminal 104.

The starting coil of the motor is shown at 148, and a centrifugal switch 150 is connected in circuit therewith, and will open as the motor approaches running speed. The movable switch contact 118 is connected to the terminal 102, while the movable switch contacts 120 and 122 are connected to the starting winding or coil 148 through the centrifugal switch 150.

The wiring connections may be easily followed, and it will be seen that when the movable switch contacts are moved to the far left position, the motor will operate at the high forward speed as a two-pole motor, and when the movable switch contacts are in the second left position, the motor will operate at its low forward speed as a three-pole motor. Similarly, when the movable contacts are moved all of the way to the right the motor will operate at high reverse speed as a two-pole motor, and when the movable contacts are at the second right position the motor will operate at low reverse speed as a three-pole motor. The transmission operates in the manner as previously described to produce the four different unidirectional output speeds from the two forward and the equal two reverse speeds.

The specific illustrative example of the invention is no doubt capable of structural variation, and all such variations as come within the spirit and scope of the appended claims are to be considered a part of the invention.

The invention is claimed as follows:

1. A power unit for producing a plurality of unidirectional output speeds, comprising a reversible electric motor operable at equal speeds in opposite directions, a worm shaft driven by said motor, a pair of worms fixed on said worm shaft for rotation therewith, an output shaft in skew relation to said worm shaft, a pair of worm gears freely rotatable on said output shaft and respectively meshing with said worms, each worm and meshing gear having a different reduction ratio from the other worm and meshing gear, said gears being driven in relatively opposite directions of rotation, and a pair of one way drive means respectively acting between said gears and said output shaft, each drive means being alternatively effective to drive said output shaft in a given direction when said gears alternatively rotate in the same given direction upon reversing of said motor, and ineffective in the opposite direction, whereby said output shaft is driven in said given direction at a plurality of different speeds.

2. A power unit for producing a plurality of unidirectional constant speeds, comprising a reversible electric motor operable at equal speeds in opposite directions, a worm shaft driven by said motor, a pair of worms of relatively opposite pitch fixed on said worm shaft in axially displaced relation, an output shaft in skew relation to said worm shaft, a pair of worm gears freely rotatable on said output shaft and respectively meshing with said worms, each worm and meshing gear having a different reduction ratio from the other worm and meshing gear, said gears being driven in relatively opposite directions of rotation, and a pair of one way drive means respectively acting between said gears and said output shaft, each drive means being alternatively effective to drive said output shaft in a given direction when said gears alternatively rotate in the same given direction upon reversing of said motor, and ineffective in the opposite direction, whereby said output shaft is driven in said given direction in a plurality of different speeds.

3. A power unit for producing a plurality of unidirectional output speeds comprising a reversible electric motor operable in equal speeds in opposite directions, a worm shaft driven by said motor, a pair of tapered worms of relatively opposite pitch fixed on said worm shaft for rotation therewith and axially offset thereon, an output shaft in skew relation to said worm shaft, a pair of worm gears of the face type freely rotatable on said output shaft and respectively meshing with said worms, each worm and meshing gear having a different reduction ratio from the other worm and meshing gear, said gears being driven in relatively opposite directions of rotation by said worms, and a pair of one way drive means respectively acting between said gears and said output shaft, each drive means being alternatively effective to drive said output shaft in a given direction when said gears alternatively rotate in the same given direction upon reversing of said motor, and ineffective in the opposite direction, whereby said output shaft is driven in said given direction at a plurality of different speeds.

4. A power unit for producing a pluarity of unidirectional output speeds comprising a reversible electric motor having a plurality of speeds in opposite directions of rotation, the plurality of speeds in one direction being equal in magnitude to the plurality of speeds in the opposite direction, a worm shaft driven by said motor, a pair of worms fixed on said shaft for rotation therewith, an output shaft in skew relation to said worm shaft, a pair of worm gears freely rotatable on said output shaft and respectively meshing with said worms, each worm and meshing gear having a different reduction ratio from the other worm and meshing gear, said gears being driven in relatively opposite directions of rotation by said worms, and a pair of one way drive means respectively acting between said gears and said output shaft, each drive means being alternatively effective to drive said output shaft in a given direction when said gears alternatively rotate in the same given direction upon reversing of said motor, and ineffective in the opposite direction, whereby said output shaft is driven in said given direction at a plurality of different speeds.

5. A power unit as set forth in claim 4, wherein the motor operates at either of two different speeds in each direction, wherein the worms are two in number, wherein the worm gears are two in number, and wherein the output shaft rotates at any of four different output speeds.

6. A power unit for producing a plurality of unidirectional output speeds comprising a reversible electric motor operable at equal speeds in opposite directions, a worm shaft driven by said motor, a plurality of worms fixed on said worm shaft for rotation therewith, an output shaft in skew relation to said worm shaft, a pair of worm gears freely rotatable on said output shaft and respectively meshing with said worms, each worm and meshing gear having a different reduction ratio from the other worm and meshing gear, said gears being driven in relatively opposite directions of rotation, each of said gears having a substantially cylindrical hub extending therefrom about said output shaft, a pair of driven clutch members each having a cylindrical portion and fixed on said output shaft respectively adjacent the hubs of said gears, and a helical spring member encircling each adjacent hub and driven clutch member and wound in such direction that rotation of the adjacent gear in one direction will tighten the spring about the hub and driven clutch member, and rotation in the opposite direction will loosen the spring member, said gears thereby being alternatively effective to drive said output shaft in a given direction when said gears alternatively rotate in the same given direction upon reversing of said motor, whereby said output shaft is driven in said given direction at a plurality of different speeds.

7. A power unit as set forth in claim 6, wherein the motor is operable at two speeds in each direction, the speeds in opposite directions being of the same magnitude, wherein the worms are tapered worms, and wherein the worm gears are of the face gear type and are two in number, said output shaft thereby having four output speeds.

8. A power unit for producing a plurality of unidirectional output speeds, comprising a reversible electric motor operable at equal speeds in opposite directions, a worm shaft driven by said motor, a plurality of worms fixed on said worm shaft for rotation therewith, an output shaft in skew relation to said worm shaft, a plurality of worm gears freely rotatable on said output shaft and respectively meshing with said worms, the portions of the worm gears meshing with the worms all being substantially coplanar, each worm and meshing gear having a different reduction ratio from the remaining worms and meshing gears, said gears being driven in relatively opposite directions of rotation, and a plurality of one way drive means respectively acting between said gears and said output shaft, each drive means being alternatively effective to drive said output shaft in a given direction when said gears alternatively rotate in the same given direction upon reversing of said motor, and ineffective in the opposite direction, whereby said output shaft is driven in said given direction at a plurality of different speeds.

9. A power unit for producing a plurality of unidirectional output speeds comprising a reversible electric motor operable at equal speeds in opposite directions, a worm shaft driven by said motor, a pair of worms fixed on said worm shaft for rotation therewith, an output shaft in skew relation to said worm shaft, a pair of worm gears freely rotatable on said output shaft and respectively meshing with said worms, said pair of worm gears being of different diameters and each worm and meshing gear having a different reduction ratio from the other worm and meshing gear, the length of the common perpendicular between the worm axis and the gear axis being less than the diameter of the smaller of the worm gears, said gears being driven in relatively opposite directions of rotation, and a pair of one way drive means respectively acting between said gears and said output shaft, each drive means being alternatively effective to drive said output shaft in a given direction when said gears alternatively rotate in the same given direction upon reversing of said motor, and ineffective in the opposite direction, whereby said output shaft is driven in said given direction at a plurality of different speeds.

10. A power unit for producing a plurality of unidirectional output speeds, comprising a reversible motor operable at equal speeds in opposite directions, a shaft driven by said motor, a plurality of tapered driving elements fixed on said driven shaft for rotation therewith, an output shaft in skew relation to said driven shaft, a plurality of beveled driven elements freely rotatable on said output shaft and respectively driven by said driving elements, each driving and driven element having a different reduction ratio from any other driving and driven element, said driven elements being driven in either of two directions and at least two driven elements simultaneously being driven in relatively opposite directions of rotation, and a plurality of drive means each acting between one of said driven elements and said output shaft, said drive means being rendered effective one at a time to drive said output shaft in a given direction when the driven element corresponding to that drive means is rotating in a given direction whereby said output shaft is driven in said driven direction at a plurality of different speeds.

References Cited in the file of this patent

UNITED STATES PATENTS

| | | |
|---|---|---|
| 2,273,626 | Connell | Feb. 17, 1942 |
| 2,473,250 | Hoffman | June 14, 1949 |
| 2,501,236 | Ryan et al. | Mar. 21, 1950 |